US010769658B2

(12) United States Patent
Carlough et al.

(10) Patent No.: US 10,769,658 B2
(45) Date of Patent: Sep. 8, 2020

(54) AUTOMATIC DETECTION OF ANOMALIES IN ELECTRONIC COMMUNICATIONS

(71) Applicant: International Business Machines Corporation, Armonk, NY (US)

(72) Inventors: Michelle L. Carlough, West Caldwell, NJ (US); Christopher M. Curtin, Acworth, GA (US); Robert K. Parkin, San Francisco, CA (US); Joshua P. Schiffman, New York, NY (US); Zuochun Tang, San Francisco, CA (US); Richard T. Winchell, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 15/281,368

(22) Filed: Sep. 30, 2016

(65) Prior Publication Data

US 2018/0096384 A1    Apr. 5, 2018

(51) Int. Cl.
*G06Q 30/02* (2012.01)
*H04L 12/58* (2006.01)

(52) U.S. Cl.
CPC ..... *G06Q 30/0248* (2013.01); *G06Q 30/0246* (2013.01); *H04L 51/18* (2013.01)

(58) Field of Classification Search
None
See application file for complete search history.

(56) References Cited

U.S. PATENT DOCUMENTS

| 6,631,400 | B1* | 10/2003 | DiStefano, III ..... G06Q 10/107 707/999.003 |
| 7,006,979 | B1 | 2/2006 | Samra et al. |
| 8,521,579 | B2 | 8/2013 | Witting |
| 9,117,227 | B1* | 8/2015 | Agrawal ............ G06Q 30/0242 |
| 9,231,897 | B1* | 1/2016 | Liden .................... H04L 51/12 |
| 2004/0204975 | A1 | 10/2004 | Witting |
| 2008/0065464 | A1 | 3/2008 | Klein et al. |

(Continued)

FOREIGN PATENT DOCUMENTS

CN    104915846 A    9/2015

OTHER PUBLICATIONS

"A Two Stage Ensemble of Diverse Models for Advertisement Ranking in KDD Cup 2012" (published on Aug. 10, 2012 at https://jyunyu.csie.org/docs/pubs/kddcup2012paper.pdf) (Year: 2012).*

*Primary Examiner* — James M Detweiler
(74) *Attorney, Agent, or Firm* — Stephanie Carusillo; Hunter E. Webb; Keohane & D'Alessandro, PLLC

(57) ABSTRACT

Embodiments described herein provide approaches for detecting anomalies in electronic communications. Specifically, a set of response metrics is obtained from each of a plurality of communications. Each of the plurality of communications is part of a communications batch. Based on an aggregation of the response metric over the plurality of communications, a response metric value for one or more of the set of response metrics is computed. This response metric value is compared to a predicted metric value corresponding to the response metric. Based on this comparison, it is determined whether the response metric value is anomalous. If the response metric value is anomalous, a remediation activity is performed.

12 Claims, 7 Drawing Sheets

(56) References Cited

U.S. PATENT DOCUMENTS

| | | | |
|---|---|---|---|
| 2008/0249832 A1* | 10/2008 | Richardson | G06Q 30/02 705/14.46 |
| 2008/0275916 A1* | 11/2008 | Bohannon | G06F 16/254 |
| 2009/0150918 A1 | 6/2009 | Wu et al. | |
| 2010/0114691 A1 | 5/2010 | Wu et al. | |
| 2010/0169264 A1 | 7/2010 | O'Sullivan et al. | |
| 2011/0055000 A1 | 3/2011 | Zhang et al. | |
| 2011/0119226 A1* | 5/2011 | Ruhl | G06F 17/3089 706/52 |
| 2012/0166278 A1 | 6/2012 | MacGregor et al. | |
| 2013/0282476 A1 | 10/2013 | Peterson et al. | |
| 2014/0143012 A1 | 5/2014 | Alon et al. | |
| 2014/0244572 A1* | 8/2014 | Hill | G06F 16/958 707/603 |
| 2015/0012351 A1 | 1/2015 | Harding | |
| 2016/0065604 A1* | 3/2016 | Chen | G06F 21/6227 726/23 |
| 2016/0117389 A1* | 4/2016 | Saini | G06F 16/958 707/722 |

\* cited by examiner

| Goal manager | | | | | : Menu |
|---|---|---|---|---|---|

Tab through the channels to manage what current goals are set or to set additional goals for the items. Select an item to edit or delete. Goal types can be managed in the administrator.

Email   SMS   Push   +

| Name | Date ⌄ 112 | Target 114 | Metric 116 | Alert 118 | Edit/Delete |
|---|---|---|---|---|---|
| Introducing Sleek Fit 2.0! | 02-17-16 | ⊙ | ⊙ | 🔔 On | Edit > |
| Feb 16 Gold Club Monthly sale | 02-17-16 | | ⊙ | 🔔 Off | Edit > |
| Feb 16-2 Bi-weekly newsletter | 02-16-16 | ⊙ | ⊙ | 🔔 On | Edit > |
| Valentine's Day promotion | 02-14-16 | | ⊙ | 🔔 On | Edit > |
| Welcome Gold Club members | 02-14-16 | ⊙ | | | Edit > |
| Feb 16 Gold Club Monthly sale | 02-13-16 | | | 🔔 Off | Edit > |
| Feb 16-2 Bi-weekly sale | 02-12-16 | ⊙ | ⊙ | 🔔 Off | Edit > |
| Feb 16 Valentine's Day promo | 02-12-16 | ⊙ | ⊙ | 🔔 On | Edit > |
| Gold Club recent members | 02-12-16 | ⊙ | ⊙ | 🔔 On | Edit > |

AUTOMATIC DETECTION OF ANOMALIES IN ELECTRONIC COMMUNICATIONS

TECHNICAL FIELD

The subject matter of this invention relates generally to electronic communications. More specifically, aspects of the present invention provide a solution for automatically analyzing and alerting of unusual events in an electronic communications batch.

BACKGROUND

In the information technology environment of today, the dissemination of data is becoming increasingly important. Mediums for such communications can include email, text message, social media posts, and/or the like. However, as more and more communications are delivered electronically, there is an increased importance that the communications that are delivered are delivered in a manner that is both efficient and effective.

One area in which this may apply is in the area of electronic marketing, particularly email marketing. Solutions that are currently available for managing an email marketing campaign generally fall into two categories. Execution engines are focused on the execution of the campaign itself and provide tools for setting up mailings based on customer lists and staging the sending of those emails. The second type of solutions are focused on pre-campaign planning. These solutions generally work to identify the groups of customers that are most likely to respond to a given email. As such, these solutions are usually considered to be strategic tools to help the marketer maximize the value of the money spent on the campaign by improving targeting of customers prior to launch.

SUMMARY

In general, embodiments described herein provide approaches for detecting anomalies in electronic communications. Specifically, a set of response metrics is obtained from each of a plurality of communications. Each of the plurality of communications is part of a communications batch. Based on an aggregation of the response metric over the plurality of communications, a response metric value for one or more of the set of response metrics is computed. This response metric value is compared to a predicted metric value corresponding to the response metric based on historical patterns of similar metrics. Based on this comparison, it is determined whether the response metric value is anomalous. If the response metric value is anomalous, a remediation activity is performed.

One aspect of the present invention includes a computer-implemented method for detecting anomalies in electronic communications, the method comprising: obtaining, by at least one computing device, a set of response metrics from each of a plurality of communications in a communications batch; computing a response metric value for a response metric of the set of response metrics based on an aggregation of the response metric over the plurality of communications; comparing the response metric value to a predicted metric value corresponding to the response metric to determine whether the response metric value is anomalous; and performing a remediation activity in response to a determination that the response metric value is anomalous.

Another aspect of the present invention includes a computer system for detecting anomalies in electronic communications, the computer system comprising: a memory medium comprising program instructions; a bus coupled to the memory medium; and a processor for executing the program instructions, the instructions causing the system to: obtain a set of response metrics from each of a plurality of communications in a communications batch; compute a response metric value for a response metric of the set of response metrics based on an aggregation of the response metric over the plurality of communications; compare the response metric value to a predicted metric value corresponding to the response metric to determine whether the response metric value is anomalous; and perform a remediation activity in response to a determination that the response metric value is anomalous.

Yet another aspect of the present invention includes a computer program product for detecting anomalies in electronic communications, the computer program product comprising a computer readable storage device, and program instructions stored on the computer readable storage device, to: obtain a set of response metrics from each of a plurality of communications in a communications batch; compute a response metric value for a response metric of the set of response metrics based on an aggregation of the response metric over the plurality of communications; compare the response metric value to a predicted metric value corresponding to the response metric to determine whether the response metric value is anomalous; and perform a remediation activity in response to a determination that the response metric value is anomalous.

BRIEF DESCRIPTION OF THE DRAWINGS

These and other features of this invention will be more readily understood from the following detailed description of the various aspects of the invention taken in conjunction with the accompanying drawings in which:

FIG. 3 shows a graphical user interface according to illustrative embodiments;

Figure 1:
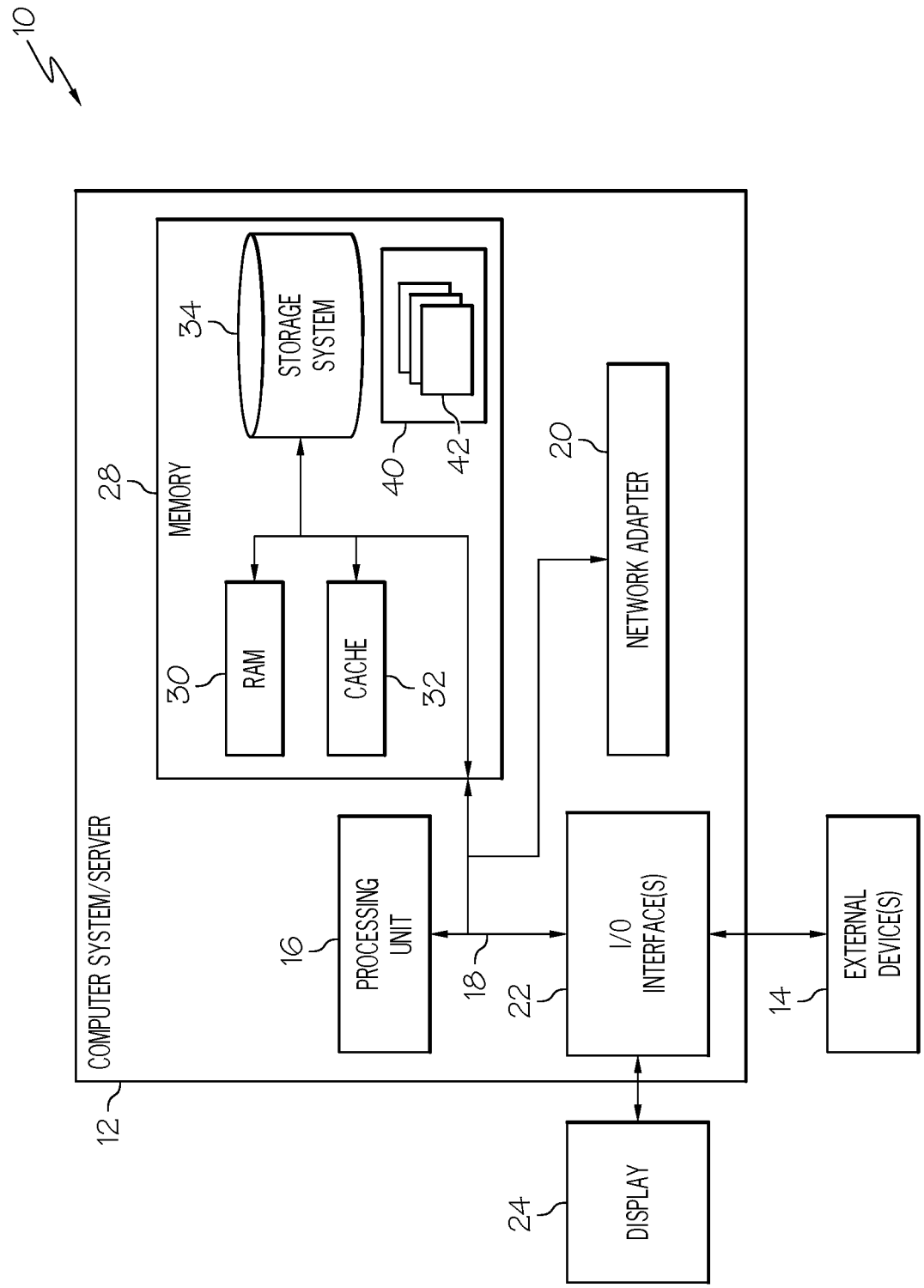
FIG. 1 shows a block diagram that illustrates a computer implementation in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments described herein provide approaches for detecting anomalies in electronic communications. Specifically, a set of response metrics is obtained from each of a plurality of communications. Each of the plurality of communications is part of a communications batch. Based on an aggregation of the response metric over the plurality of communications, a response metric value for one or more of the set of response metrics is computed. This response metric value is compared to a predicted metric value corresponding to the response metric. Based on this comparison, it is determined whether the response metric value is anomalous. If the response metric value is anomalous, a remediation activity is performed.

Referring now to FIG. 1, a computerized implementation 10 of an embodiment for detecting anomalies in electronic communications is shown. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and/or distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, and/or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and/or the like, that perform particular tasks or implement particular abstract data types. In this particular example, computer system 12 represents an illustrative system for detecting anomalies in electronic communications. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and/or a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as for detecting anomalies in electronic communications, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a consumer to interact with computer system 12; and/or any devices (e.g., network card, modem, etc.) that enable computer system 12 to communicate with one or more other computing devices. Such communication can occur via I/O interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples include, but are not limited to: microcode, device drivers, redundant processing units, external disk drive arrays, RAID systems, tape drives, and data archival storage systems, etc.

Figure 2:
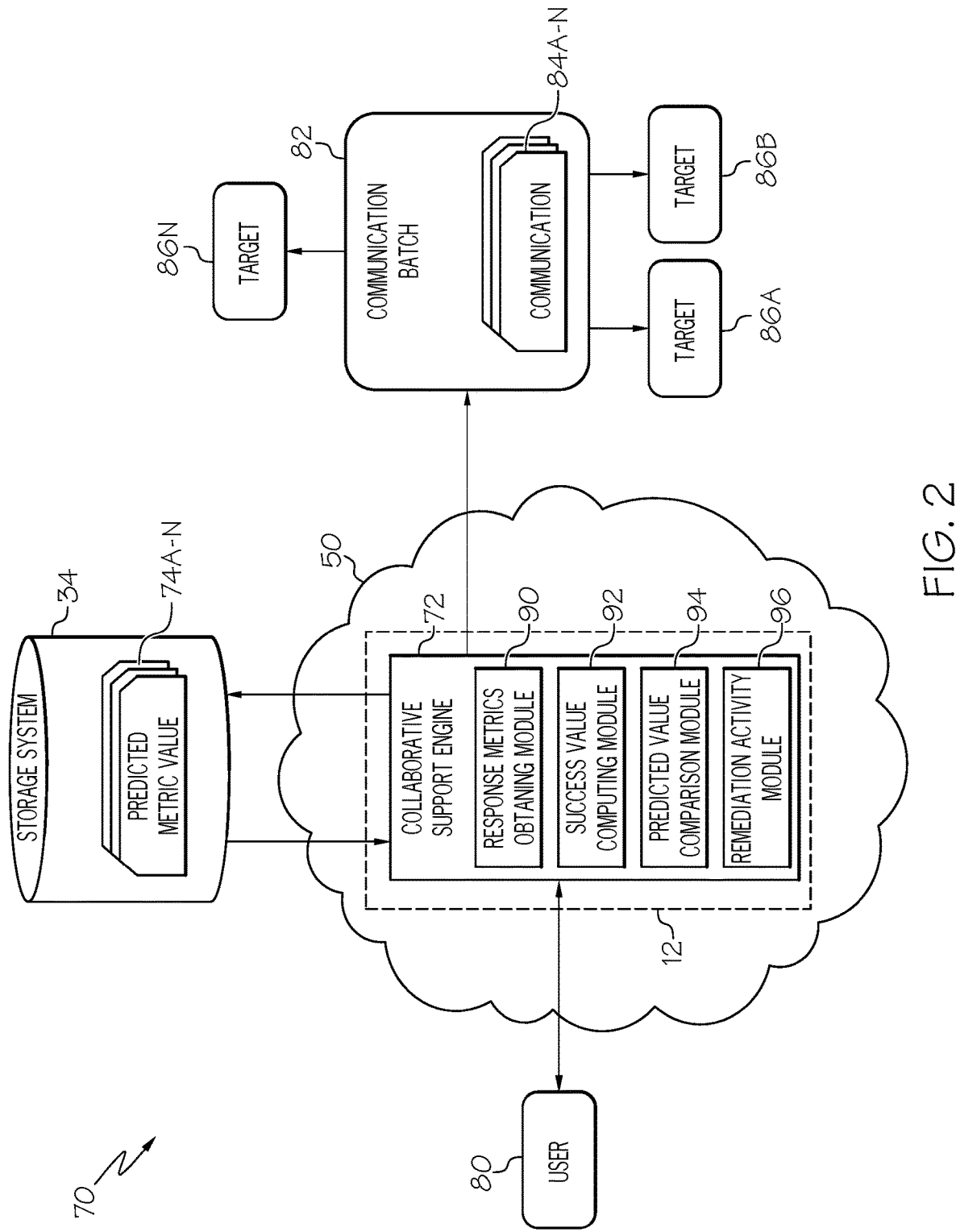
FIG. 2 shows an example system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each client need not have an anomaly detection engine (hereinafter "system 72"). Rather, system 72 could be loaded on a server or server-capable device that communicates (e.g., wirelessly) with the clients to provide anomaly detection therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 2 for brevity purposes.

In any case, system 72 may perform multiple functions similar to a general-purpose computer. Specifically, among other functions, system 72 can function to detect anomalies in electronic communications in networked computing environment 70. To accomplish this, system 72 can include: a response metrics obtaining module 90, a success value computing module 92, a predicted value comparison module 94, and a remediation activity module 96.

As further shown in FIG. 2, networked computing environment 70 can be utilized by a user 80 to distribute a communication batch 82 having a plurality of communications 84A-N (hereafter referred to singly as "communication 84N" and collectively as "communications 84") to each of a plurality of targets 86A-N (hereafter referred to singly as "target 86N" and collectively as "targets 86"). User 80 can be an individual, a group of individuals, or an organization that has a goal of distributing communications 84 (e.g., to a large number of targets 84). To this extent, electronic communications 84 can take the form of any solution for communicating between users of electronic devices, including, but not limited to, email, SMS, social media, push-type communications, or any other type of electronic communication now known or later envisioned. Further, the electronic devices used by user 80 and targets 86 to send and receive, respectively, electronic communications 84 can include, but are not limited to: a server, a server farm, a desktop computer, a laptop computer, a notebook computer, a tablet, a personal digital assistant, a smart phone, a smart watch, a personal music device, and/or the like.

In an embodiment, user 80 can be a marketer or a marketing team. In this, as well as other embodiments, communication batch 82 can be an email marketing campaign and communications 84 can be marketing communications. In this embodiment, the marketer or marketing team may use a planning tool to identify the groups of customers (targets 86) that are most likely to respond to the particular communication 84N. Alternatively, or in addition, the marketer may use an execution engine to set up the communication 84N based on customer lists and to stage the sending of communications.

Referring now to FIG. 3, a graphical user interface (GUI) 100 is shown according to embodiments of the invention. Referring additionally to FIG. 2, GUI 100 includes a list of marketing campaigns 110. Each marketing campaign 100 in the list can be thought of as having one or more communication batches 82. In addition, GUI 100 includes a date 112 field corresponding to each marketing campaign 110. This date 112 indicates when the corresponding marketing campaign 110 has been or is to be distributed.

The inventors of the invention described herein have discovered certain deficiencies in the way communications 84 in a communication batch 82, such as in a marketing campaign 110, are currently sent. For example, current solutions do not provide users 80 (e.g., marketers) who are sending the communications a way to have clear visibility into how a communication batch 82 is performing after the communications 84 have been sent. Execution engines, while they may be well suited for setting up and staging the communications, only return high level metrics (e.g., whether a particular communication 84N has been sent, has bounced, or has been opened). These solutions do not contain the predictive capabilities to determine how the communication batch 82 should be expected to perform or the comparative capabilities to determine how a communication batch 82 is performing based on these expectations. They also do not generally have the ability to detect whether abnormal response behavior occurs during the mailing rollout. Similarly, planning tool-type solutions focus on forecasting long term returns prior to a launch and are not designed to monitor a communication batch 82 in real-time as it is being sent out. As such, no current solution provides good analytical tools for managing a communication batch 82 (e.g., a marketing campaign) once it is already in progress.

Additionally, a single user 80 may have hundreds or thousands of individual communication batches 82 being distributed for a related matter. Because of this, keeping track and understanding any metrics that may be provided over multiple communication batches 82 can be very difficult, especially in the initial hours after the communication batch 82 is sent, when notification of an issue would be most important to user 80. Further, even in solutions that allow user 80 to manually set a static tolerance for receiving an alert, the tolerances set by user 80 may be of little to no use, as the usefulness depends on the user's 80 knowledge of the specific nature of the communication batch 82 and on what the likely consumer responses metrics values should be expected for such a communication batch 82. If the static tolerances are set too tightly, the user 80 will receive too many notifications for occurrences that are not anomalies. Conversely, if the static tolerances are set too loosely, user 80 may miss identifying anomalies that are potentially very important to user 80's business. In addition, these static tolerances may need to be manually adjusted over time, as an event that may be an anomaly soon after a communication batch 82 is sent, might be completely normal after some time has elapsed. Still further, since a static tolerance cannot take into account the information content of the data as time elapses, it cannot determine whether the events that have been tagged as anomalies are statistically different from what is to be expected. These shortcomings can become further exacerbated in situations in which a large number of tolerances must be set.

The invention described herein addresses some or all of these issues. It provides a solution that is able to understand how systems and consumers are likely to respond at a fairly detailed communication 84 event level. It is also able to understand what normal and abnormal response patterns should look like during the process of the distribution. Further, it is also able to understand how normal and abnormal patterns may change over time for a given communication batch 82 and how much information is required to be present in data about a given communication batch 82 to statistically determine whether an event is an anomaly.

To this extent, certain embodiments of the present invention may offer various technical computing advantages, including automated and optimized decision making regarding which communications are distributed more efficiently, and store this information in a system. This information can be used in a self-learning system to further improve communication distribution efficiency and to quickly detect anomalies in newly distributed communications as more information is gathered. Certain embodiments of the present invention implement an automatically adjusted set of metrics over time such that the results monitoring operations may efficiently utilize human resources as well as providing ever better communications to the recipients. As such, the current invention can make the communication distribution process more efficient, saving time and resources.

Referring again to FIG. 2, response metrics obtaining module 90 of system 72, as executed by computer system/server 12 is configured to obtain a set of response metrics from each of the plurality of communications 84 in communications batch 82. These response metrics could include data pertaining to email sends, email opens, email clicks, email bounces, and/or the like. In addition, each response metric can include timestamp information that indicates a precise time that the metric was obtained. To this extent, timestamp information could include a date and time, an amount of time from a fixed point in time (e.g., from a launch of a communication batch 82), or any other measurement of time now known or later developed for indicating when the metric was obtained.

For example, referring again to FIGS. 2 and 3, assume that communications 84 in a communication batch 82 for a marketing campaign 110 entitled "Introducing Sleek Fit 2.0" has just been sent to a number of targets 86. Further assume that the target address of one of the communications 84A is incorrect or is no longer correct. Response metrics obtaining module 92 might obtain metrics that indicate that the communication 84A was sent at 11:01 a.m. on Feb. 17, 2016 and that the communication 84A received a bounce indication on 11:04 a.m. on the same day. Further assume that another communication 84B was sent, opened, and clicked on by the intended target 84B. Response metrics obtaining module 92 might obtain metrics that indicate that the communication 84B was sent at 11:02 a.m. on Feb. 17, 2016, that the communication 84B was opened at 12:05 p.m. and 5:12 p.m. on the same day, and that the target 86B clicked on the information in the communication 84B at 5:15 p.m. on the same day. Each of these metrics can be obtained and forwarded for processing immediately streaming in real time as the corresponding events are occurring. This allows the analysis to be dynamic and current. In addition, the metrics can be stored (e.g., in storage system 34) for future processing.

Referring again to FIG. 2, success value computing module 92 of system 72, as executed by computer system/server 12, is configured to compute a response metric value for a response metric of the set of response metrics. Each response metric value is computed based on an aggregation of the response metric over the plurality of communications. For example, if a response metric value is being computed for email opens, the email opens response metrics data retrieved from every communication 84N in communication batch 82 is aggregated to perform the computation. Further, the timestamp information from each of the response metrics data can be used to represent the response metric value as a data curve over time.

Figure 4:
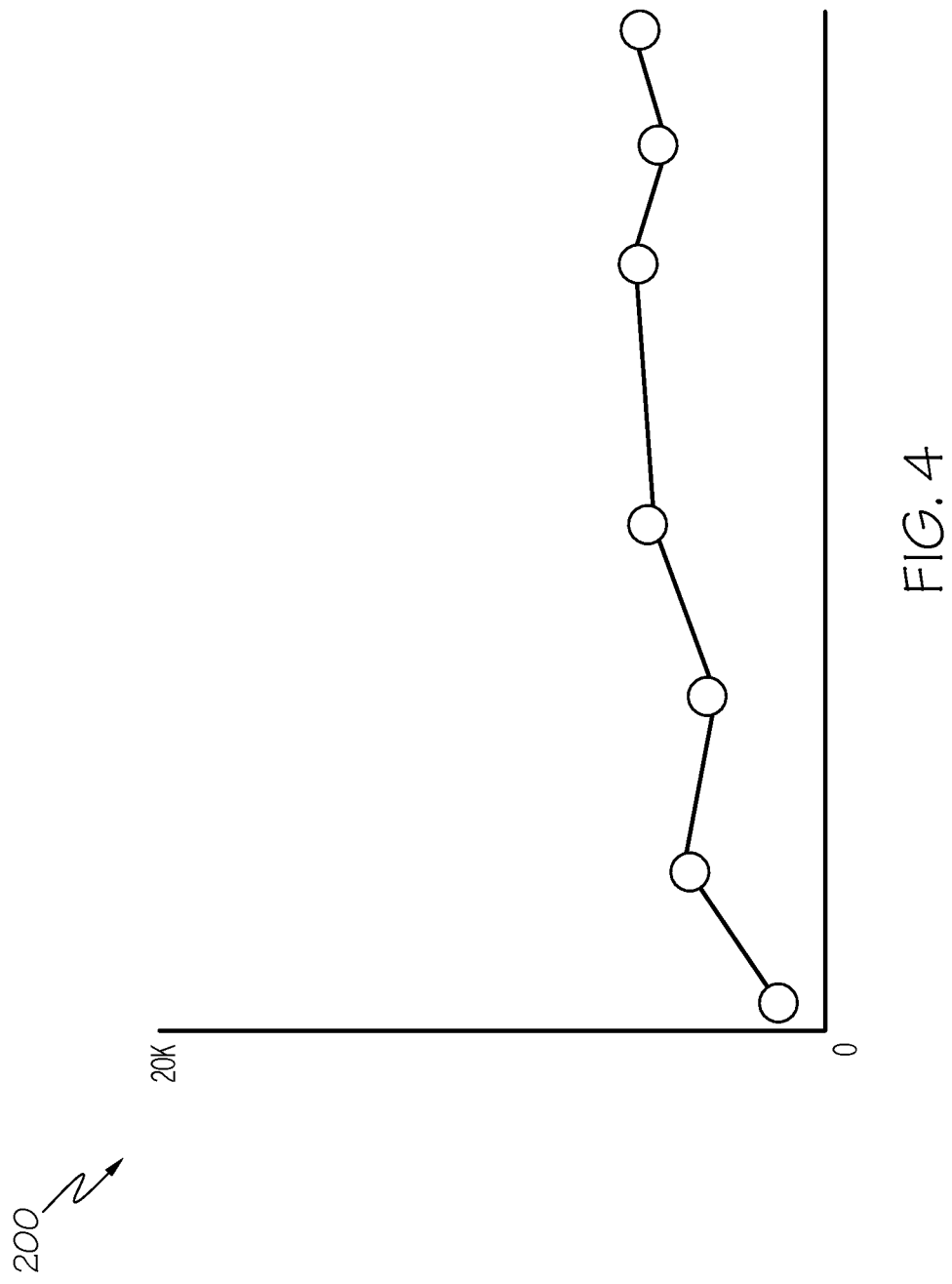
FIG. 4 shows an example graph according to illustrative embodiments.

Referring now to FIG. 4, an example graph 200 is illustrated according to embodiments of the invention. Graph 200 illustrates a possible representation of a response metric value as a data curve over time. As shown, a communication batch 82 of 20K communications 84 have been sent beginning at time 0. Graph 200 tracks one particular response metric (e.g., email open) over time for the communication batch 82.

Referring again to FIG. 2, predicted value comparison module 94 of system 72, as executed by computer system/server 12, is configured to compare the response metric value to a predicted metric value 74A-N (hereafter referred to singly as "predicted metric value 84N" and collectively as "predicted metric values 84") corresponding to the response metric. The results of this comparison are used to determine whether the response metric value is anomalous. Predicted metric values 84 can be obtained in a variety of different ways. For example, response metric values for a particular response metric can be gathered from a number of communication batches 82 sent over a period of time. The data in these values can be cleansed and validated to detect and fix missing or incorrect issues in the success values. These success values can be clustered across a set of communication batches 82 to group data from communication batches 82 together based on the similarity of the data curves. Then the information contained in communications 84 can be analyzed to find features and/or variables that are predictive of a particular cluster by comparing features/variables within the communications 84 that are similar across the cluster and contrasting these features/variables with those of communications 84 that are not in the cluster.

The predictive features/variables are used to estimate different kinds of models using different estimation techniques. These models can include, but are not limited to: linear models, dynamic linear models, stochastic process models, hierarchical temporal memory models, gradient boosted trees, recurrent neural networks with long-short term memory, and/or the like. These model types are evaluated according to standard fit and hold-out prediction statistics (e.g., MAPE, AIC, BIC, etc.) to select the highest value models for use in ensemble modeling. The selected models have a further estimation run on top of them, resulting in the application of a weight to each model form. A combined ensemble model is then constructed from the results from the selected initial models and their weights and is packaged as the final predicted metric values 74 used in the comparison. In cases where there are only a few data points available (such as in the first few minutes after the new communication batch 82), predictive features/variable values can be determined based on similarity measures and clustering (such as cosine similarity, entropy measures, Support Vector Machines or Hidden Markov Models) relative to a cluster of previous communication batches.

As such, when a new communication batch 82 is run, the communication 84 can be analyzed to compare the response with the predicted metric values and the normal historical range of metric values. Based on this comparison, the current communication batch 82 can be analyzed to see if a statistically significant difference exists. The predicted value comparison module 94 can make the determination as to whether the results are anomalous based on either the predicted metric values or historical norms using a classification model. This classification model could have the form of logistic models, one-class support vector machines or similar techniques used for binary statistical classification. Because the predicted metric values 74 that are used in the comparison are tailored to the type of communication batch 82 being sent, the comparison is able to more reliably indicate anomalies while delivering fewer false positives. In addition, the predicted metric values 74 are continuously improved as metrics from each new communication batch 82 are added to the values used to build the data models. Further, these updates can be performed in real time as streaming data from batch communications 82 is received.

Remediation activity module 96 of system 72, as executed by computer system/server 12, is configured to perform a remediation activity in response to a determination that the response metric value is anomalous. This remediation action can take one or more of many different forms. In an embodiment, remediation activity module 96 may perform data cleansing and validation to fix issues in the communication 84 on the fly and resend the fixed communication 84. In an embodiment, remediation activity module 96 may update the data models with the anomalous data. In an embodiment, remediation activity module 96 may forward an alert that advises user 80 of the anomaly. This alert can include one or more explanations, charts, graphs, etc., and can be provided to user 80 via email, SMS messaging, push service, and/or the like.

Figure 5A:
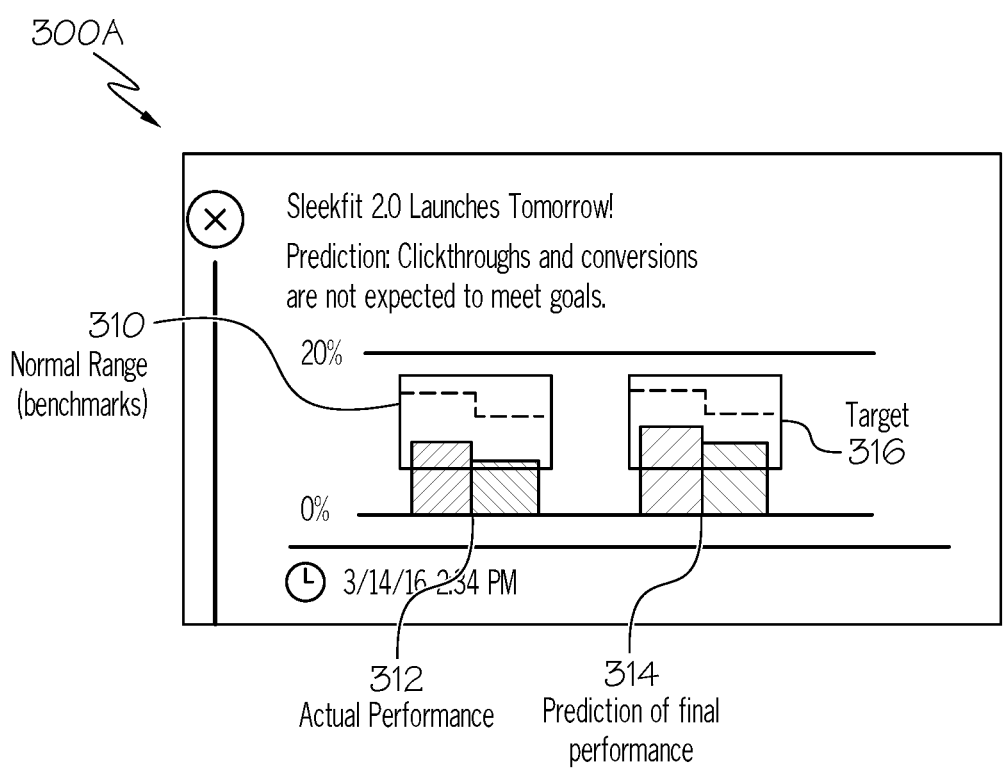
FIGS. 5A-B show example reports according to illustrative embodiments.
Figure 5B:
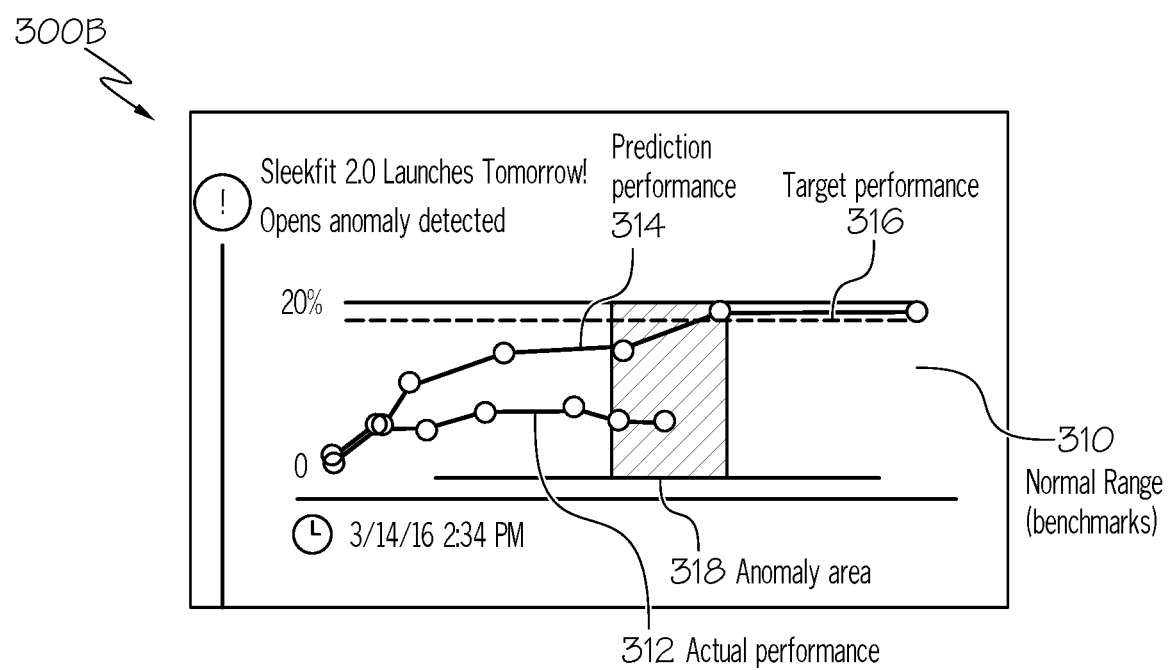

Referring now to FIGS. 5A-B, a pair of example reports 300A, 300B is shown according to embodiments of the invention. As shown, report 300A is a bar graph showing results from the comparing of a communication batch 82 of the "Introducing Sleek Fit 2.0" marketing campaign referenced earlier. Similarly, report 300B is a line graph showing results from the comparing of a communication batch 82 of the "Introducing Sleek Fit 2.0" marketing campaign referenced earlier. As shown, reports 300A, 300B each include the actual performance 312 for the communication batch 82, a normal range 310, a target performance 316, and a prediction of final performance 314. Further, report 300B shows an anomaly area 318 in which anomalous results have been detected for the communication batch 82. Referring additionally to FIG. 3, either or both of reports 300A, 300B can be provided to user 80 based on user preferences in GUI 100. As shown, user 80 can select which data should be reported on (e.g., target 114, metric 116) and for what actions an alert should be sent.

Figure 6:
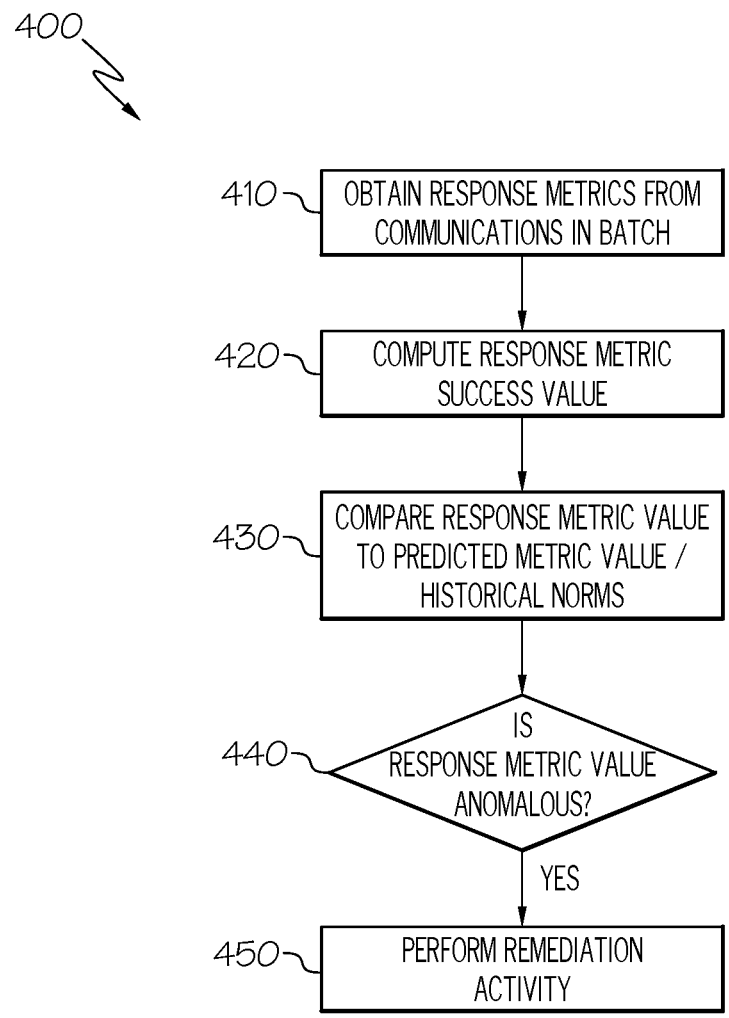
FIG. 6 shows a process flow diagram according to illustrative embodiments.

Referring now to FIG. 6 in conjunction with FIGS. 1-2, a method flow diagram 400 according to an embodiment of the present invention is shown. At 410, response metrics obtaining module 90 of system 72, as executed by computer system/server 12, obtains response metrics from communications 84 in a communications batch 82. At 420, success value computing module 92 computes a response metric value. At 430, predicted value comparison module 94 compares the response metric value to predicted metric value 74N and/or its normal range. At 440, predicted value comparison module 94 makes a determination as to whether the response metric value is anomalous. If yes, at 450, remediation activity module 96 performs a remediation activity.

Process flowchart 400 of FIG. 6 illustrates the architecture, functionality, and operation of possible implementations of systems, methods, and computer program products according to various embodiments of the present invention.

In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for detecting anomalies in electronic communications. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for detecting anomalies in electronic communications. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (i.e., the Internet, a local area network, a wide area network and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for detecting anomalies in electronic communications. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for detecting anomalies in electronic communications, the method comprising:

identifying, using at least one electronic device of a user, a group of customers that are most likely to respond to a particular communication;

transmitting, from a server over a network to electronic devices associated with each of the group of customers, a plurality of electronic communications in a communications batch that is a batch of emails sent from a common batch time and having common content of the particular communication;

serving, from a marketing server to the at least one electronic device of the user, a graphical user interface (GUI), the GUI including a listing of individual batch jobs having a plurality of batch jobs, a date for each batch job, a selection of a target for each batch job, a selection of a metric for each batch job, a selection of an alert for each batch job, and a selection of an alert type that includes alert types of email, SMS, and Push;

receiving, by the marketing server, a user preference indicating a push-type alert for the communications batch;

obtaining, by the at least one computing device, a set of response metrics from each of the plurality of electronic communications in the communications batch in a real-time data stream;

computing, by the at least one computing device, a response metric value pattern for a response metric of the set of response metrics based on an aggregation of the response metric over the plurality of electronic communications;

analyzing a content of the electronic communications to retrieve characteristics of the communication that are in common with a cluster of previous communications batches in a plurality of clusters, each of the plurality of clusters having value patterns from a plurality of previous communication batches clustered together based on a similarity of data curves corresponding to the previous communication batches;

generating a predicted metric value pattern corresponding to the response metric based on the cluster, including:
analyzing accumulated response metrics from a plurality of previously sent communication batches; and
calculating the predicted metric value pattern for each of the accumulated response metrics based on the analyzing;

analyzing the cluster of previous communications batches to find predictive features of the cluster by comparing features and variables within communications that are similar across the cluster and contrasting features and variables with other communications that are not in the cluster;

estimating a plurality of different models based on the predictive features, the plurality of different models including linear models, dynamic linear models, stochastic process models, hierarchical temporal memory models, gradient boosted trees, and recurrent neural networks with long-short term memory;

assigning a weight to each model of the plurality of different models based on an evaluation of each model according to standard fit and hold-out prediction statistics;

constructing a combined ensemble model based on the weighted plurality of different models;

comparing, by the at least one computing device, a trend over time indicated by the response metric value pattern to a predicted metric value pattern corresponding to the response metric based on the combined ensemble model to determine whether the response metric value pattern is anomalous; and performing a remediation activity in response to a determination that the response metric value pattern is anomalous, the remediation activity including updating the plurality of different models with the anomalous data and transmitting a push-type alert to at least one electronic device of the user advising the user of the anomalous response value pattern.

2. The method of claim 1, wherein the set of response metrics include response metrics pertaining to email sends, email opens, email clicks, and email bounces.

3. The method of claim 1, wherein the response metric value pattern is a curve that tracks the response metric over time from the common batch launch time.

4. The method of claim 1, wherein the electronic communications are marketing emails and wherein the communications batch is an email marketing campaign.

5. A computer system for detecting anomalies in electronic communications, the computer system comprising:
 a memory medium comprising program instructions;
 a bus coupled to the memory medium; and
 a processor for executing the program instructions, the program instructions causing the system to:
  identify, using at least one electronic device of a user, a group of customers that are most likely to respond to a particular communication;
  transmit, from a server over a network to electronic devices associated with each of the group of customers, a plurality of electronic communications in a communications batch that is a batch of emails sent from a common batch time and having common content of the particular communication;
  serve, from a marketing server to the at least one electronic device of the user, a graphical user interface (GUI), the GUI including a listing of individual batch jobs having a plurality of batch jobs, a date for each batch job, a selection of a target for each batch job, a selection of a metric for each batch job, a selection of an alert for each batch job, and a selection of an alert type that includes alert types of email, SMS, and Push,
  receive, by the marketing server, a user preference indicating a push-type alert for the communications batch;
  obtain, by the at least one computing device, a set of response metrics from each of the plurality of electronic communications in the communications batch in a real-time data stream;
  compute a response metric value pattern for a response metric of the set of response metrics based on an aggregation of the response metric over the plurality of electronic communications;
  analyze a content of the electronic communications to retrieve characteristics of the communication that are in common with a cluster of previous communications batches in a plurality of clusters, each of the plurality of clusters having value patterns from a plurality of previous communication batches clustered together based on a similarity of data curves corresponding to the previous communication batches;
  generate a predicted metric value pattern corresponding to the response metric based on the cluster, including:
   analyzing accumulated response metrics from a plurality of previously sent communication batches; and
   calculating the predicted metric value pattern for each of the accumulated response metrics based on the analyzing;
  analyze the cluster of previous communications batches to find predictive features of the cluster by comparing features and variables within communications that are similar across the cluster and contrasting features and variables with other communications that are not in the cluster;
  estimate a plurality of different models based on the predictive features, the plurality of different models including linear models, dynamic linear models, stochastic process models, hierarchical temporal memory models, gradient boosted trees, and recurrent neural networks with long-short term memory;
  assign a weight to each model of the plurality of different models based on an evaluation of each model according to standard fit and hold-out prediction statistics;
  construct a combined ensemble model based on the weighted plurality of different models;
  compare a trend over time indicated by the response metric value pattern to a predicted metric value pattern corresponding to the response metric based on the combined ensemble model to determine whether the response metric value pattern is anomalous; and
  perform a remediation activity in response to a determination that the response metric value pattern is anomalous, the remediation activity including updating the plurality of different models with the anomalous data and transmitting a push-type alert to at least one electronic device of the user advising the user of the anomalous response value pattern.

6. The computer system of claim 5, wherein the set of response metrics include response metrics pertaining to email sends, email opens, email clicks, and email bounces.

7. The computer system of claim 5, wherein the response metric value pattern is a curve that tracks the response metric over time from the common batch launch time.

8. The computer system of claim 5, wherein the electronic communications are marketing emails and wherein the communications batch is an email marketing campaign.

9. A computer program product for detecting anomalies in electronic communications, the computer program product comprising a non-transitory computer readable storage device having program instructions stored thereon, to:
  identify, using at least one electronic device of a user, a group of customers that are most likely to respond to a particular communication;
  transmit, from a server over a network to electronic devices associated with each of the group of customers, a plurality of electronic communications in a communications batch that is a batch of emails sent from a common batch time and having common content of the particular communication;
  serve, from a marketing server to the at least one electronic device of the user, a graphical user interface (GUI), the GUI including a listing of individual batch jobs having a plurality of batch jobs, a date for each batch job, a selection of a target for each batch job, a selection of a metric for each batch job, a selection of an alert for each batch job, and a selection of an alert type that includes alert types of email, SMS, and Push,
  receive, by the marketing server, a user preference indicating a push-type alert for the communications batch;
  obtain, by the at least one computing device, a set of response metrics from each of the plurality of electronic communications in the communications batch in a real-time data stream;
  compute a response metric value pattern for a response metric of the set of response metrics based on an aggregation of the response metric over the plurality of electronic communications;
  analyze a content of the electronic communications to retrieve characteristics of the communication that are in common with a cluster of previous communications batches in a plurality of clusters, each of the plurality of clusters having value patterns from a plurality of previous communication batches clustered together based on a similarity of data curves corresponding to the previous communication batches;
  generate a predicted metric value pattern corresponding to the response metric based on the cluster, including:
    analyzing accumulated response metrics from a plurality of previously sent communication batches; and
    calculating the predicted metric value pattern for each of the accumulated response metrics based on the analyzing;
  analyze the cluster of previous communications batches to find predictive features of the cluster by comparing features and variables within communications that are similar across the cluster and contrasting features and variables with other communications that are not in the cluster;
  estimate a plurality of different models based on the predictive features, the plurality of different models including linear models, dynamic linear models, stochastic process models, hierarchical temporal memory models, gradient boosted trees, and recurrent neural networks with long-short term memory;
  assign a weight to each model of the plurality of different models based on an evaluation of each model according to standard fit and hold-out prediction statistics;
  construct a combined ensemble model based on the weighted plurality of different models;
  compare a trend over time indicated by the response metric value pattern to a predicted metric value pattern corresponding to the response metric based on the combined ensemble model to determine whether the response metric value pattern is anomalous; and
  perform a remediation activity in response to a determination that the response metric value pattern is anomalous, the remediation activity including updating the plurality of different models with the anomalous data and transmitting a push-type alert to at least one electronic device of the user advising the user of the anomalous response value pattern.

10. The computer program product of claim 9, wherein the set of response metrics include response metrics pertaining to email sends, email opens, email clicks, and email bounces.

11. The computer program product of claim 9, wherein the response metric value pattern is a curve that tracks the response metric over time from the common batch launch time.

12. The computer program product of claim 9, wherein the electronic communications are marketing emails and wherein the communications batch is an email marketing campaign.

* * * * *